Dec. 23, 1947.  H. C. GRAY  2,433,043
APPARATUS FOR TESTING CANS FOR LEAKAGE
Filed Dec. 21, 1944  14 Sheets—Sheet 1

Inventor
Harry C. Gray
By Mason, Porter & Diller
Attorneys

Dec. 23, 1947. H. C. GRAY 2,433,043
APPARATUS FOR TESTING CANS FOR LEAKAGE
Filed Dec. 21, 1944 14 Sheets-Sheet 3
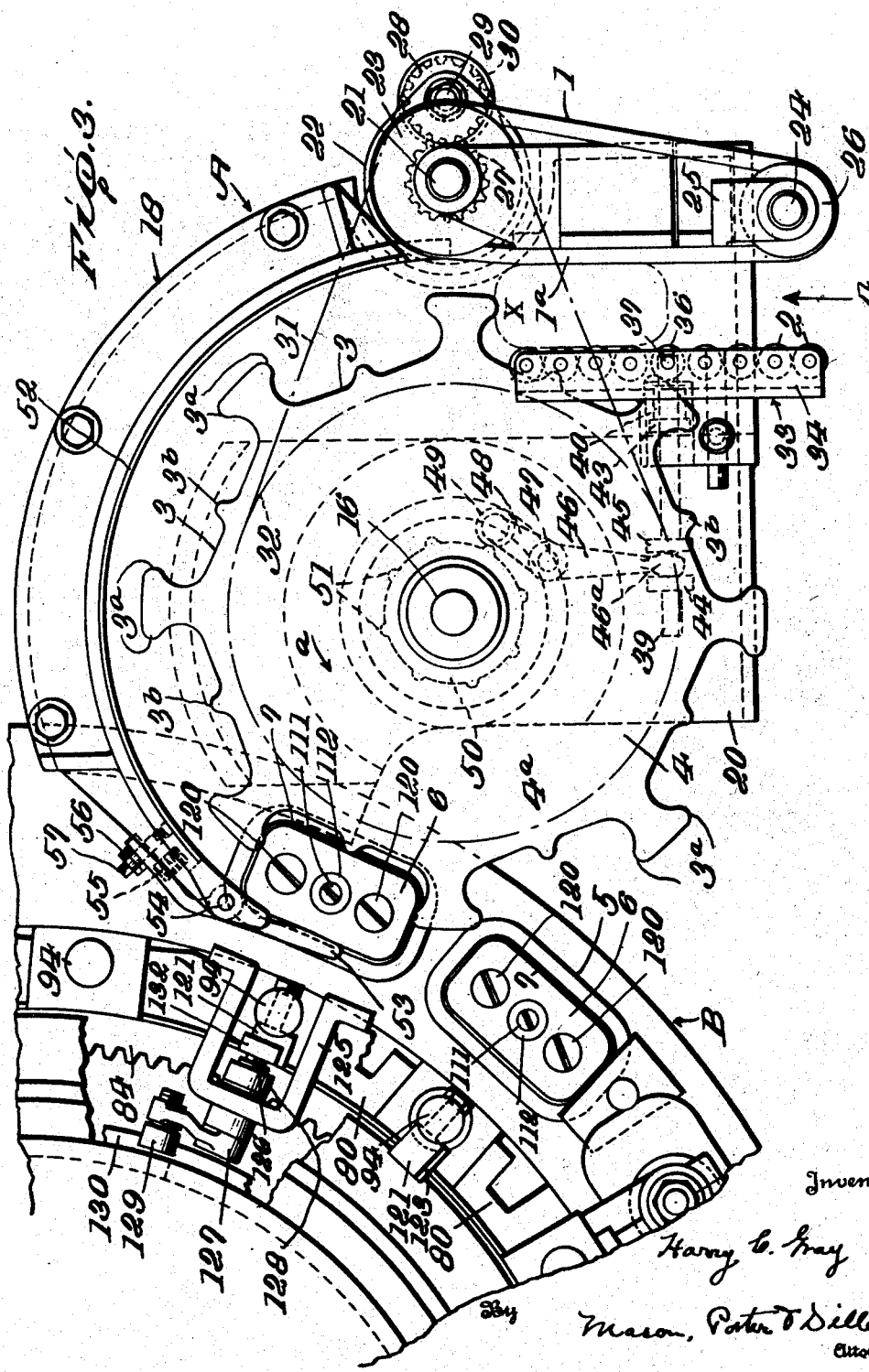

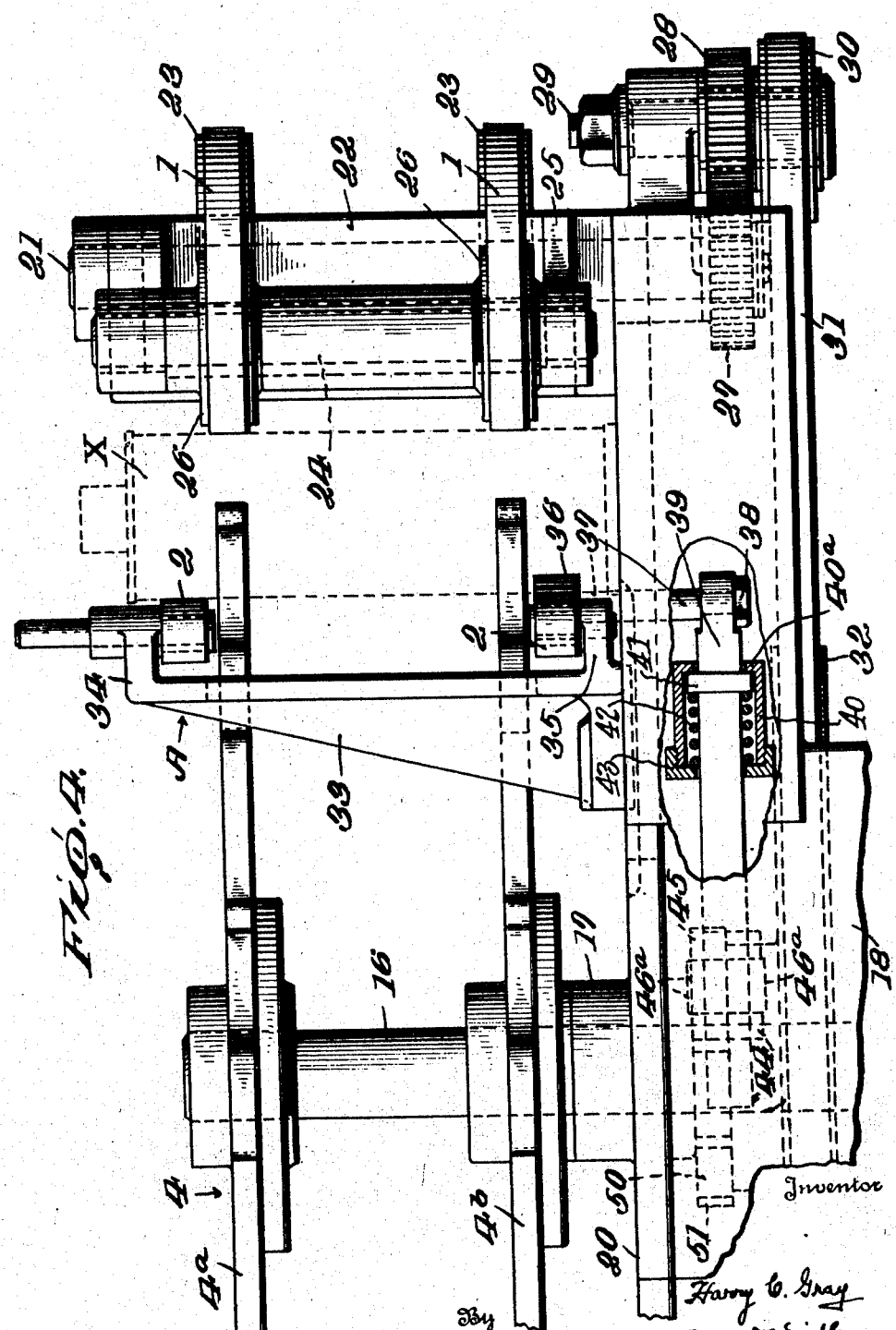

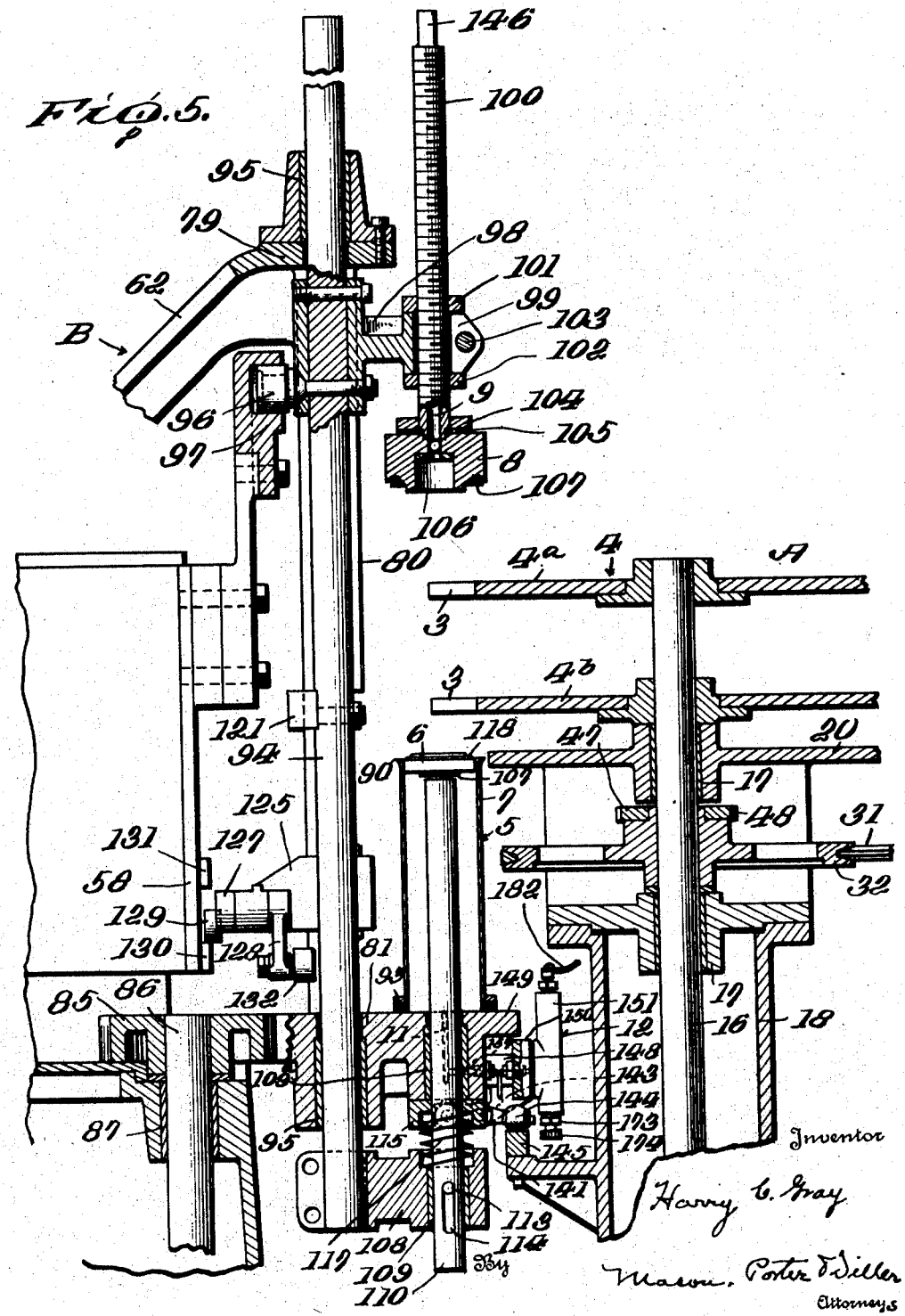

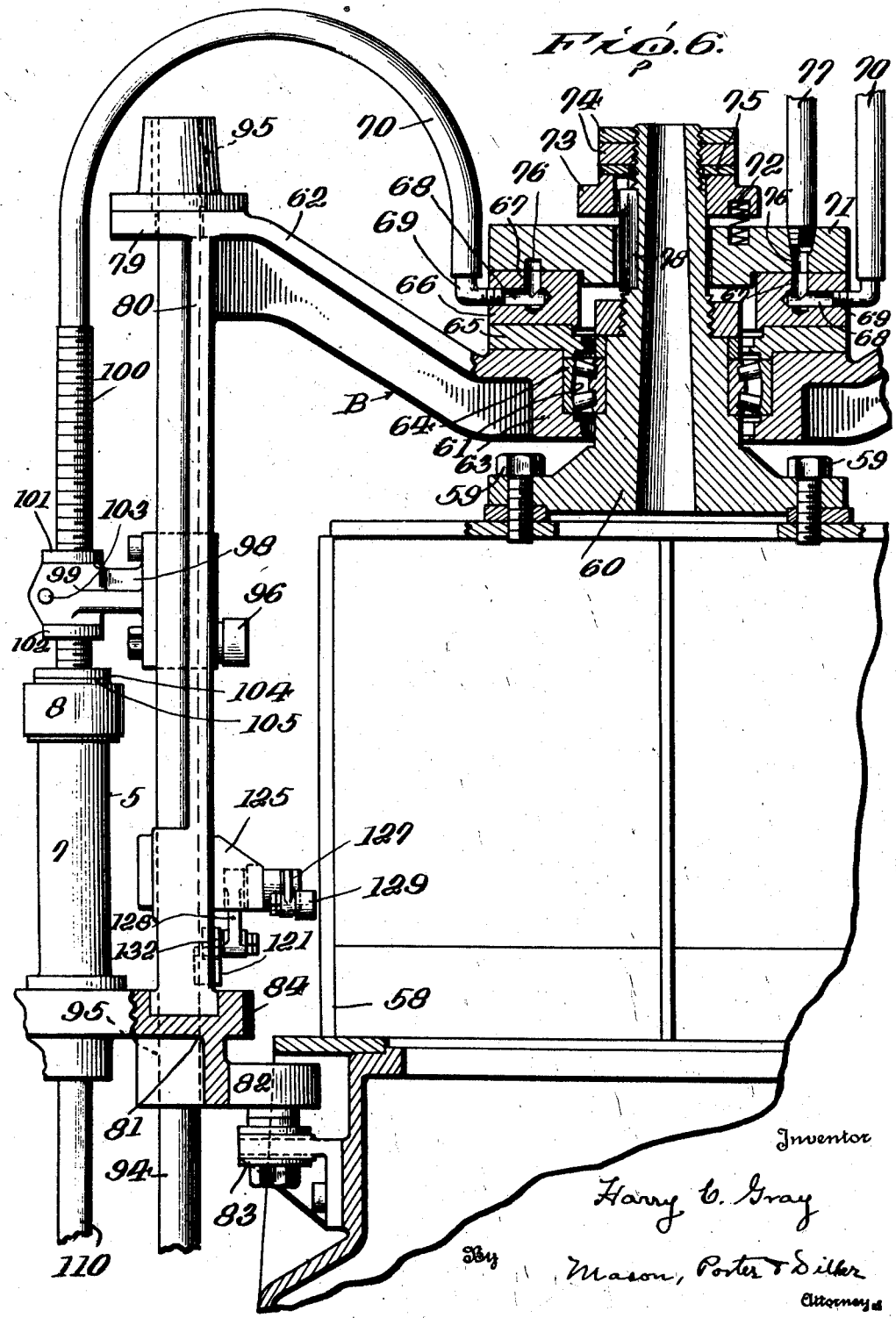

Dec. 23, 1947. H. C. GRAY 2,433,043
APPARATUS FOR TESTING CANS FOR LEAKAGE
Filed Dec. 21, 1944 14 Sheets-Sheet 7
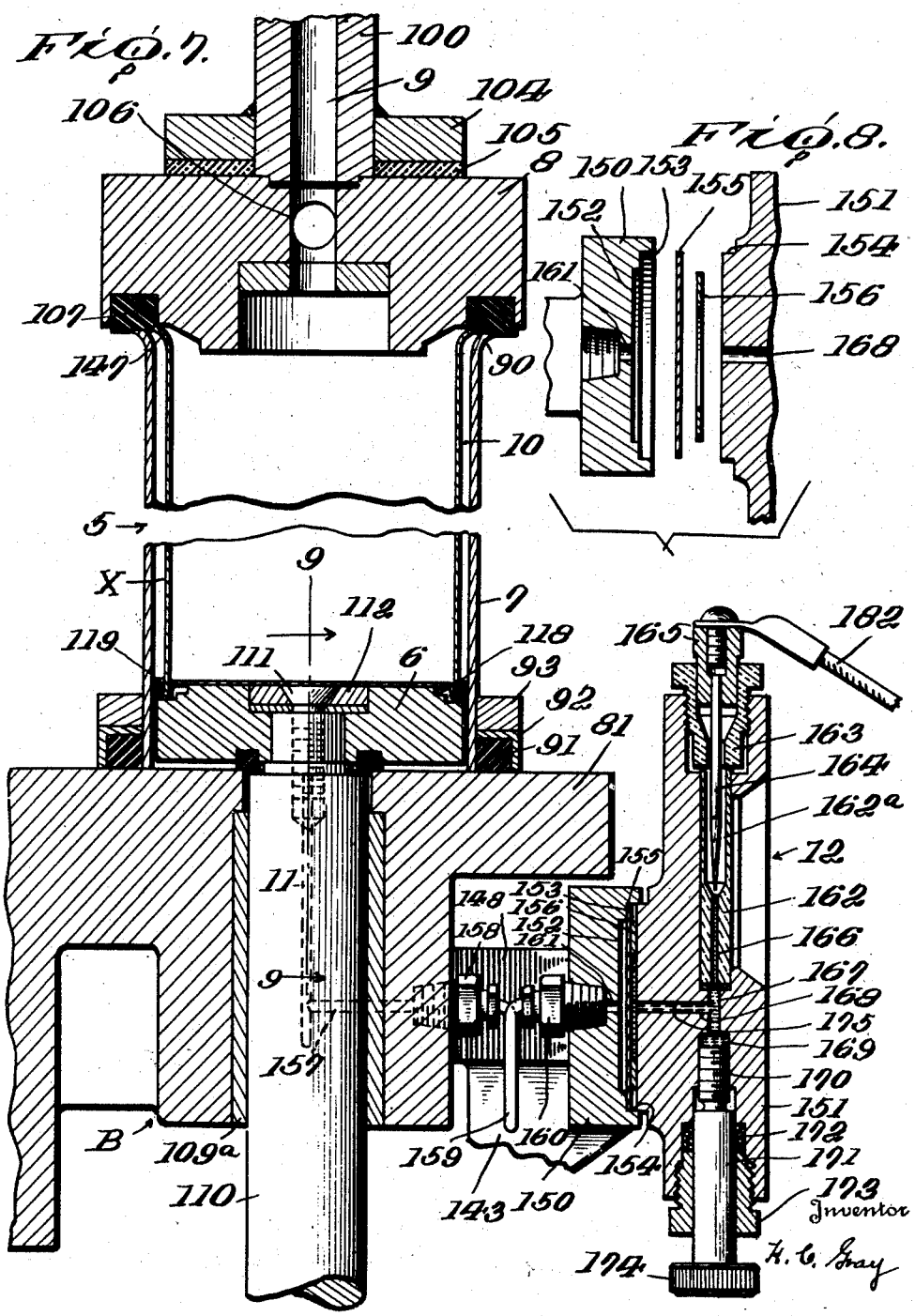
Inventor
H. C. Gray
By Mason, Porter & Diller
Attorneys Dec. 23, 1947.            H. C. GRAY            2,433,043
              APPARATUS FOR TESTING CANS FOR LEAKAGE
              Filed Dec. 21, 1944        14 Sheets-Sheet 8

Fig. 9.

Inventor
Harry C. Gray
By
Mason, Porter & Diller
Attorneys

Dec. 23, 1947.  H. C. GRAY  2,433,043
APPARATUS FOR TESTING CANS FOR LEAKAGE
Filed Dec. 21, 1944  14 Sheets-Sheet 9

Fig. 10.

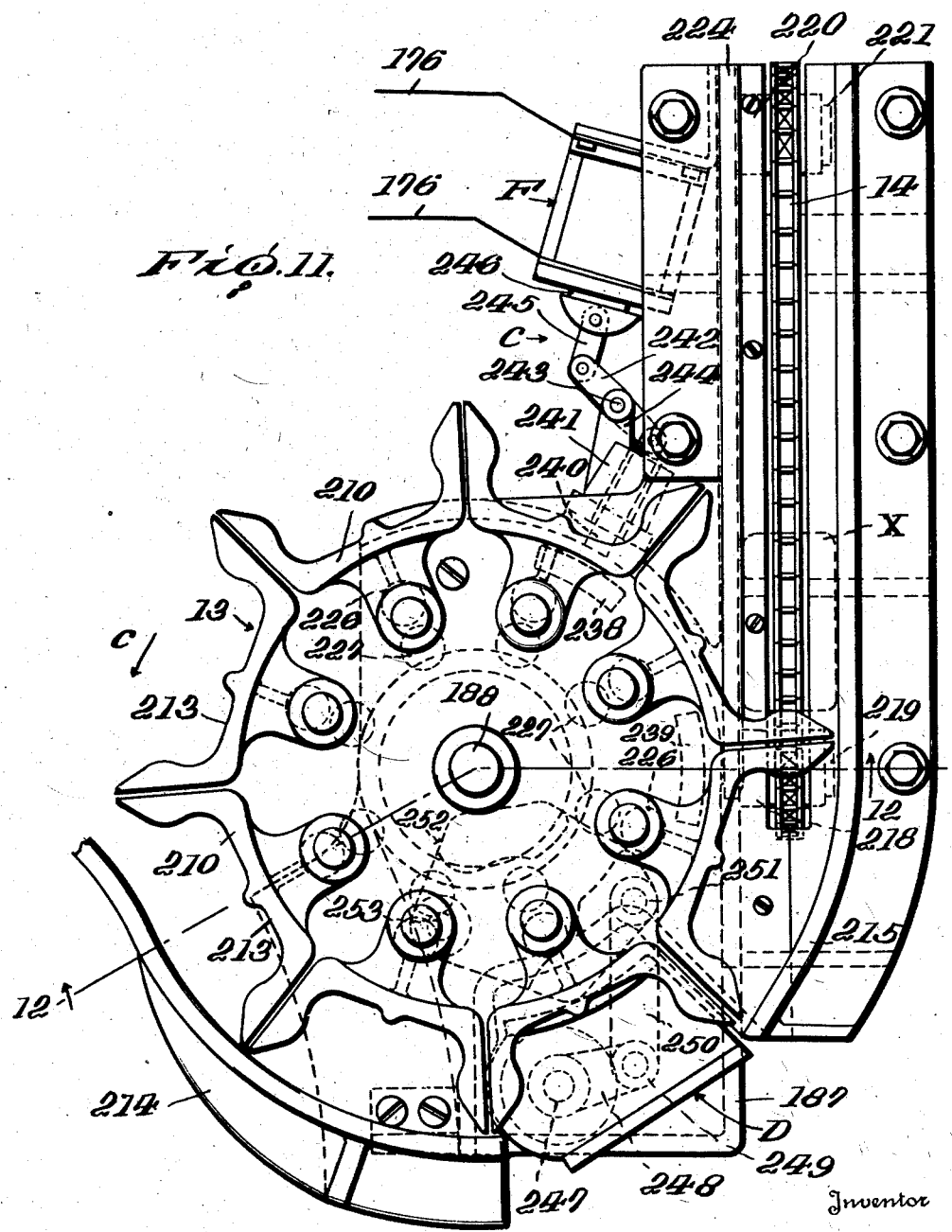

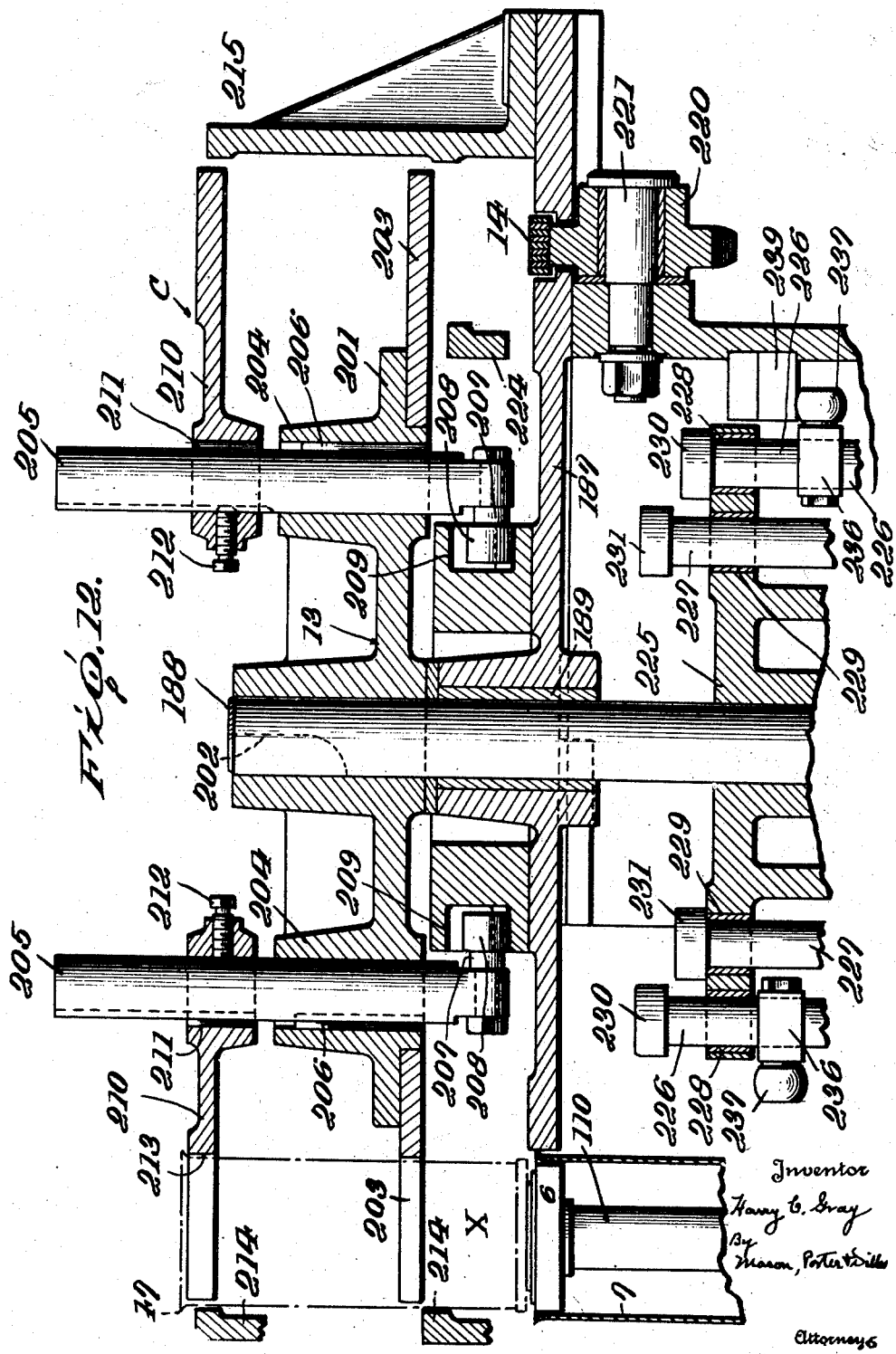

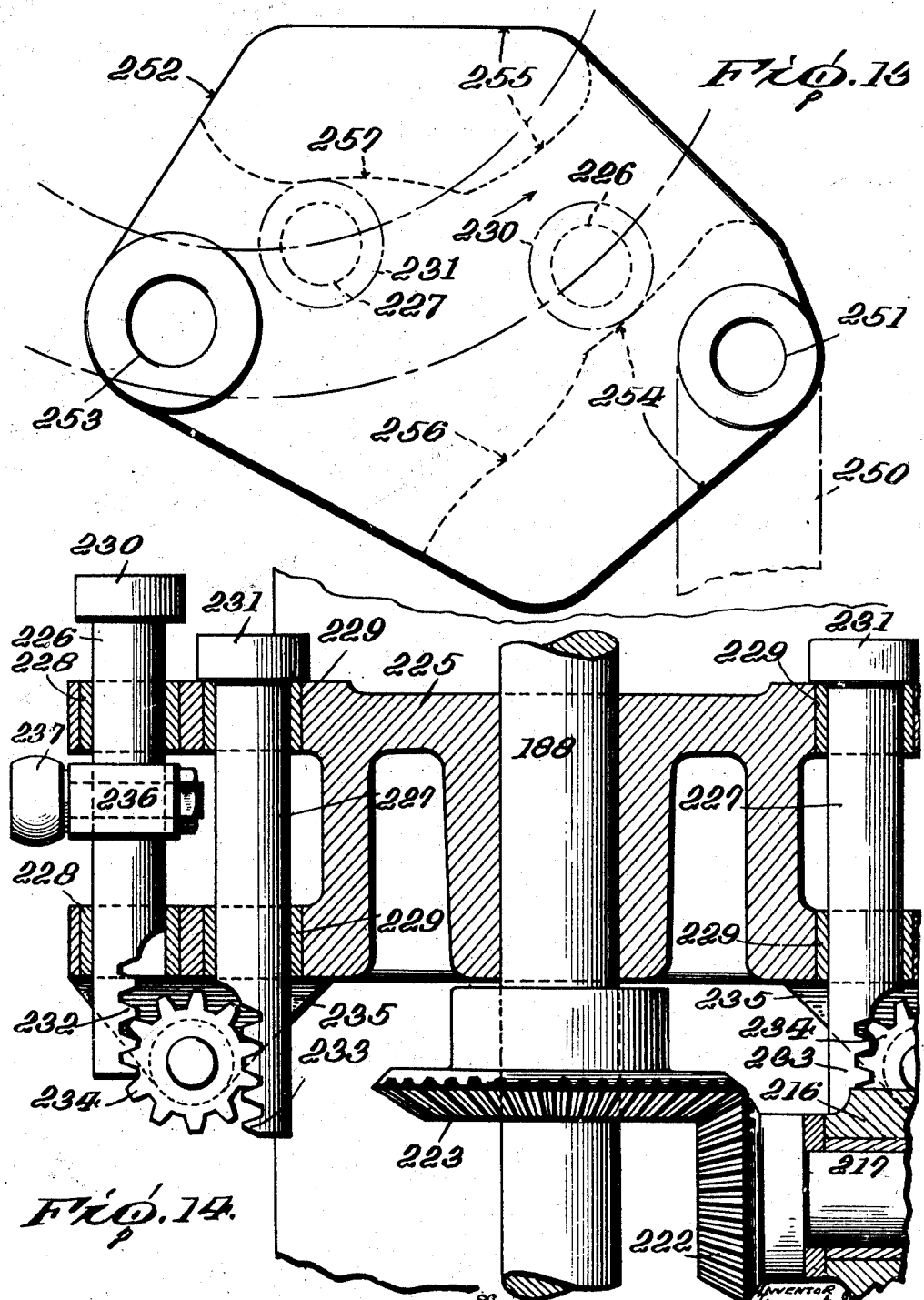

Dec. 23, 1947. H. C. GRAY 2,433,043
APPARATUS FOR TESTING CANS FOR LEAKAGE
Filed Dec. 21, 1944 14 Sheets-Sheet 13
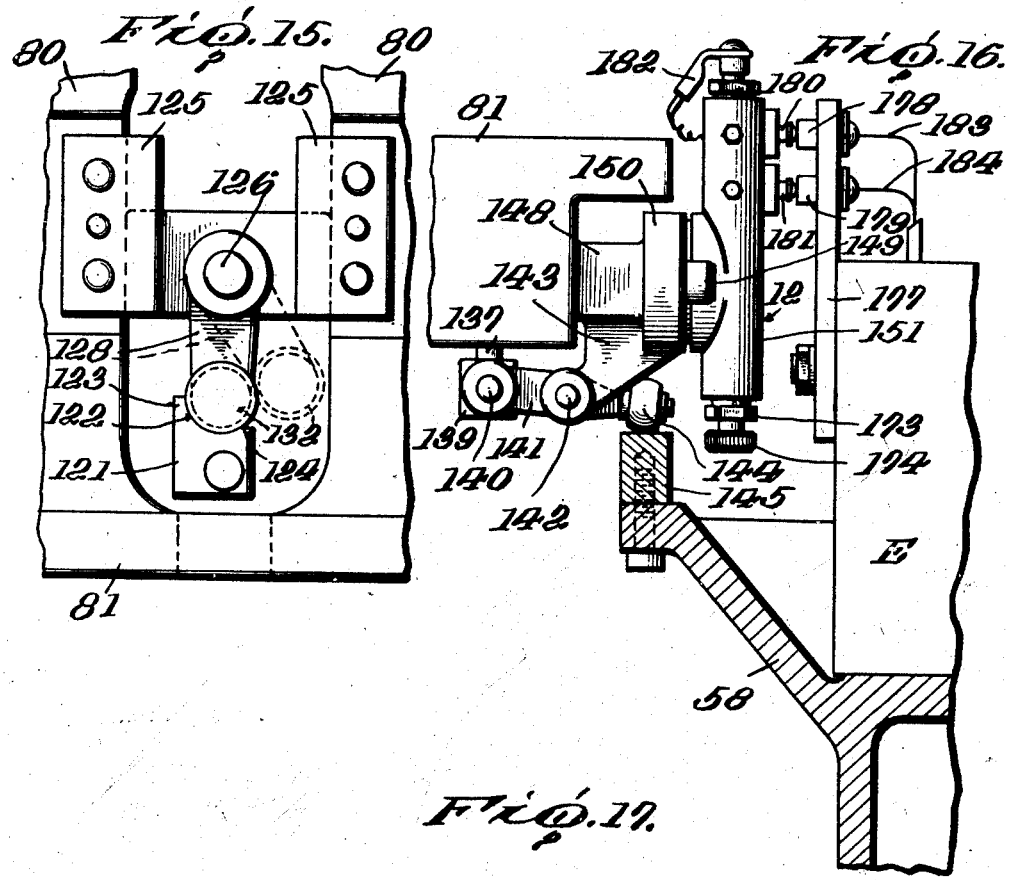
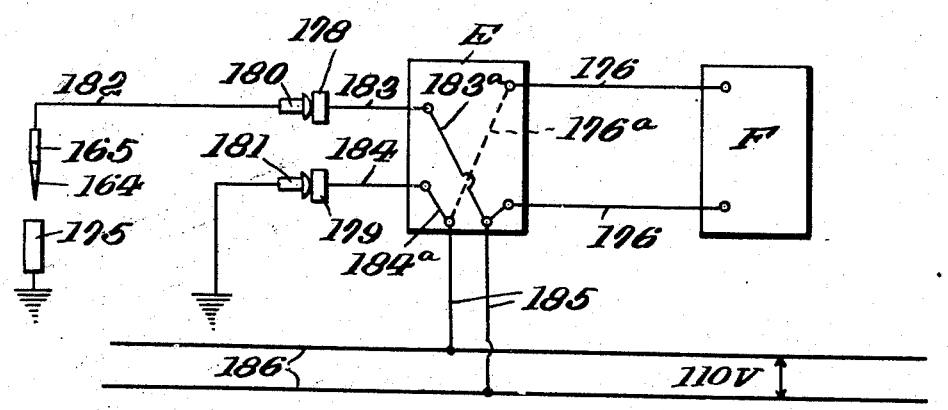
Inventor
Harry C. Gray
By Mason, Porter & Diller
Attorneys Dec. 23, 1947.  H. C. GRAY  2,433,043
APPARATUS FOR TESTING CANS FOR LEAKAGE
Filed Dec. 21, 1944  14 Sheets-Sheet 14
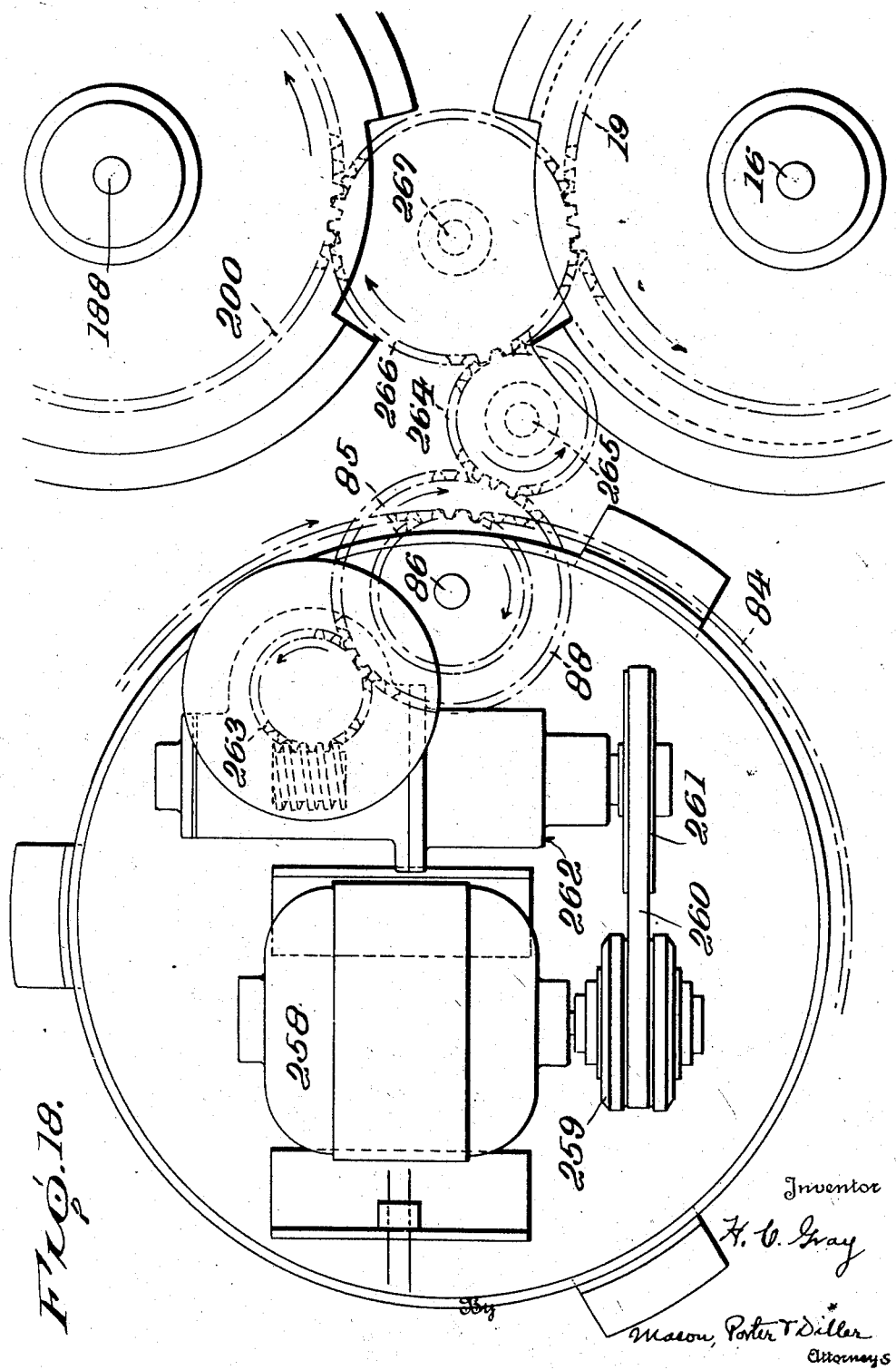

Patented Dec. 23, 1947

2,433,043

UNITED STATES PATENT OFFICE 2,433,043

APPARATUS FOR TESTING CANS FOR LEAKAGE

Harry C. Gray, Chicago, Ill., assignor to Continental Can Co., Inc., New York, N. Y., a corporation of New York Application December 21, 1944, Serial No. 569,210

22 Claims. (Cl. 73—43)

This invention relates to apparatus for testing cans for leaks and for separating imperfect or leaky cans from perfect or non-leaky cans.

In Patents 1,815,522, O'Neil et al., and 1,815,523 O'Neil, there are disclosed machines for testing cans for leaks wherein a can being tested is enclosed in a testing chamber, the open end of the can is sealed, and the interior of the can is subjected to air under pressure. If the can leaks, the compressed air escapes into a space between the outside of the can and the testing chamber and acts directly on a column of electrically conducting fluid to close or open an electric circuit. The electric circuit includes means for operating an ejector which separates leaky cans from non-leaky cans.

An object of the present invention is to provide improved apparatus of this general class in which the compressed air which escapes through a leaky can acts on a displaceable mechanical member, displacement of which controls the operation of the means which separates the leaky cans from the non-leaky cans.

Another object of the invention is to provide apparatus of the character described in which the mechanical member, upon being displaced by the leaking air, acts on a body of fluid, e. g., a column of electrically conducting liquid for controlling the operation of the can separating means.

Another object of the invention is to increase the sensitivity or accuracy of the testing equipment.

The invention may be embodied in machines constructed and equipped to receive cans from a source of continuous supply and to deliver or feed the cans in properly spaced relationship to a movable testing assembly, e. g., a turret provided with a plurality of testing units adapted to test the cans in a continuous succession. After having been tested, the cans, whether good or bad, are passed on to a discharge mechanism which may include a take-off turret and discharge conveyor. Associated with or forming part of each testing unit is means for applying air pressure within the can being tested and a mechanical device which responds to any leaking of air from the can being tested for setting up a conditioning mechanism for actuating a gate or rejecter device to operate when the leaky can arrives at the rejecter device so as to prevent the leaky can from being passed on to the discharge conveyor. Thus, all good or non-leaky cans pass from the testing turret to the take-off turret and thence to the discharge conveyor, whereas leaky cans are delivered from the testing turret to the take-off turret but are deflected or shunted off from the testing turret so as not to be delivered to the discharge conveyor.

Another object of the invention is to provide improved means for timing the delivery of cans to a turret which forwards cans to be tested.

Another object of the invention is to provide apparatus of the character stated including new and improved means for effecting transfer of cans from a feed-in turret to a testing turret.

Another object of the invention is to provide apparatus of the kind referred to including improved mechanism for resiliently holding a can being tested with its open end in sealing engagement with a sealing head.

Another object of the invention is to provide apparatus of the kind referred to in which a locking device holds a sealing head in contact with the open end of a can being tested and the open end of a testing chamber so as to insure that the parts will be held in air-tight sealed relation during testing.

Another object of the invention is to provide novel and improved means for effecting transfer of the tested cans from the testing turret to the take-off turret.

Another object of the invention is to provide can-diverting mechanism for diverting or rejecting a leaky can from the take-off turret.

A further object of the invention is to provide can-diverting mechanism of the kind referred to which, although operable upon cans being transported by the take-off turret, is controlled by testing equipment carried by the testing turret.

Other objects of the invention will become apparent from a reading of the following detailed description, the appended claims, and the accompanying drawings.

In the drawings:

Figure 3 is a top plan view on an enlarged scale showing can timing or spacing mechanism, a feed-in turret, and parts of a testing turret.

Figure 4 is an enlarged scale elevational view showing a belt and roller structure for feeding cans to the feed-in turret as viewed when looking in the direction of the arrow 4 in Figure 3, and showing parts of a can intercepting mechanism in section.

Figure 5 is a vertical section on an enlarged scale and showing contiguous portions of a feed-in turret, testing turret and mechanism carried by the testing turret.

Figure 6 is a fragmentary vertical sectional view of a testing turret showing equipment for delivering compressed air to cans being tested, the section being taken on the line 6—6 of Figure 1.

Figure 7 is a fragmentary vertical sectional view of a testing unit drawn on a greatly enlarged scale.

Figure 8 is a fragmentary detail section showing a testing unit diaphragm and mounting parts therefor separated.

Figure 9 is a fragmentary section on the line 9—9 of Figure 7.

Figure 10 is an enlarged fragmentary top plan view of a testing turret and associated electrical equipment for operating mechanism to set a gate in position to divert a leaky can.

Figure 11 is an enlarged top plan view of a take-off turret and a discharge conveyor chain.

Figure 12 is a fragmentary vertical section on the line 12—12 of Figure 11 drawn on an enlarged scale.

Figure 13 is a detail top plan view of a gate operating cam.

Figure 14 is an enlarged fragmentary section on the line 12—12 of Figure 11.

Figure 15 is an enlarged fragmentary elevational view of a locking block and toggle lever.

Figure 16 is a fragmentary elevation showing electrical equipment for operating the leaky can rejecter gate.

Figure 17 is an electrical wiring diagram, and

Figure 18 is a diagrammatic showing of driving gearing.

General arrangement

Figure 1:
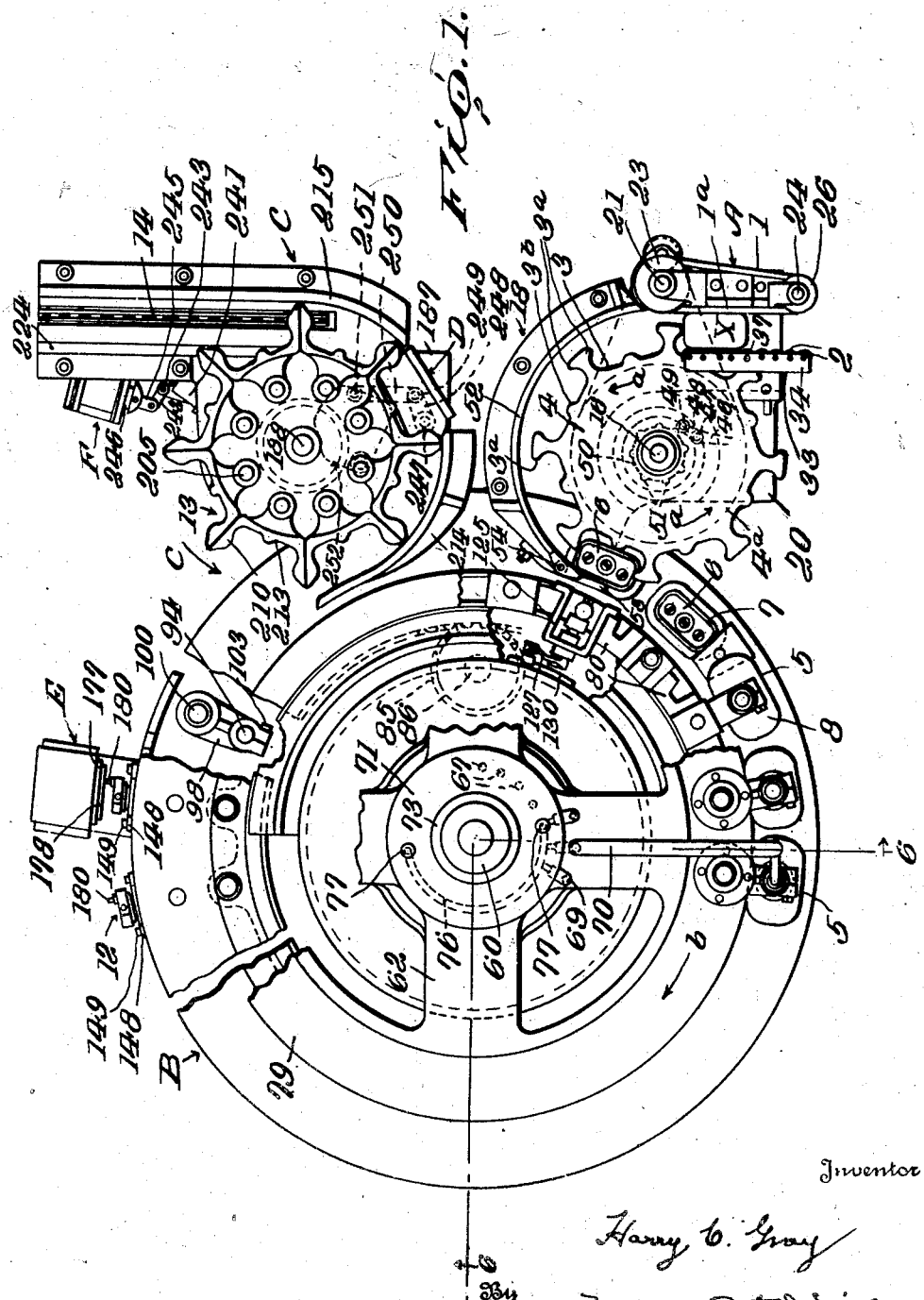
Figure 1 is a top plan view of apparatus embodying the invention with some parts being omitted.

In the illustrative embodiment of the invention cans X are delivered in any suitable manner to the feed-in mechanism A which comprises two vertically spaced belts 1 having stretches 1ª spaced from and parallel to a set of guide rollers 2. The belt stretches 1ª contact the cans X and feed them in the direction of the arrow 4 in Figure 3 so as to deliver them individually into pockets 3 on a feed-in turret 4 which rotates in the direction of the arrow $a$ (Figure 1).

The testing turret B rotates in the direction of the arrow $b$ (Figure 1) and is equipped with a plurality of circumferentially spaced testing units generally designated 5. Each of the testing units includes a can support or pad 6 mounted for vertical reciprocation in a testing chamber 7. When a testing unit 5 is positioned to receive a can from the feed-in turret 4 the support 6 is elevated so that its top surface is approximately at or level with the top of the chamber 7 as shown in Figure 5. A can X is delivered by the turret 4 to the support 6 and the support then moves down to position the can within the chamber as shown in Figure 7. A sealing head 8 is applied in sealing relation to both the top of the chamber 7 and the can therein, and air under pressure is introduced through a duct 9 to subject the interior of the can to fluid pressure. If the can is imperfect the compressed air will leak out into the space 10 between the can and the walls of the testing chamber 7 and will be conducted through a passage 11 to a pressure responsive detector unit generally designated 12 which controls the separation of the leaky cans from the non-leaky cans.

All tested cans, whether leaky or non-leaky, are delivered to a take-off mechanism C which includes a take-off turret 13 rotatable in the direction of the arrow $c$ in Figure 1, which in turn delivers good cans to a discharge conveyor chain 14. Leaky cans, however, are deflected by a gate D positioned adjacent the turret 13 for separating leaky cans from non-leaky cans. The gate D normally is set to permit cans to go on around with the turret 13 to be delivered to the conveyor 14. When a can leaks during testing, the associated detector unit 12 is so conditioned that when it arrives at a housing E containing electrical control equipment, a circuit is closed to energize a solenoid F. Energizing of the solenoid F conditions mechanism carried by the turret 13 for operating the gate D to reject the leaky can when it arrives at the gate.

Figure 2:
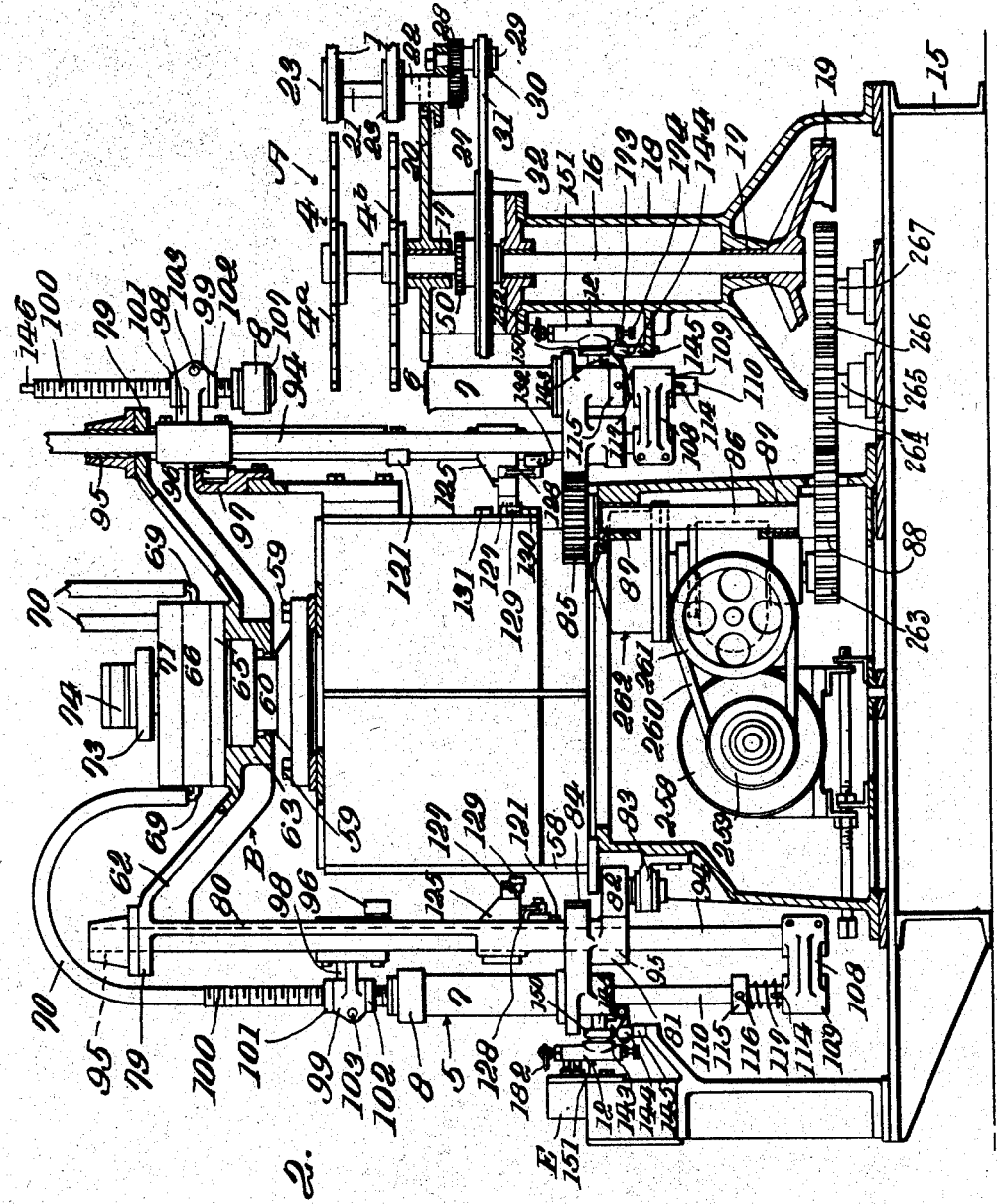
Figure 2 is a vertical sectional view of the apparatus shown in Figure 1 with some parts omitted and others shown in elevation.

The parts may all be carried on a base 15, as shown in Figure 2.

Feed-in mechanism

The feed-in turret 4 comprises upper and lower sections 4ª and 4ᵇ secured to a vertical shaft 16 mounted to rotate in bearings 17 carried by a frame 18 supported on the main base 15. A gear 19 driven in a manner to be described later is fixed to the lower end of the shaft 16. The frame 18 includes a table 20 on which the cans rest while being carried around in the pockets 3 of the turret 4.

For mounting and operating the belts 1, a shaft 21 is journaled in a bracket 22 and is equipped with vertically spaced pulleys 23. A shaft 24 (Figure 3) journaled in a bracket 25 is equipped with vertically spaced pulleys 26 respectively at the same levels as the pulleys 23 so that one belt 1 may be passed around each pair of coplanar pulleys 23—26. Fast with the shaft 21 is a gear 27 which meshes with a gear 28 rotatable on a stub shaft 29. A pulley 30 fixed to the gear 28 is engaged by a belt 31 which passes around a pulley 32 fast with the shaft 16. Thus driving of the shaft 16 causes the turret 4 to rotate and also drives the belts 1 through the medium of the pulley 32, belt 31, pulley 30, gears 28 and 27, shaft 21, and pulleys 23.

The frame 18 (Figure 4) is equipped with a bracket 33 formed with upper and lower flanges 34 and 35 mounting the rollers 2 in upper and lower sets to provide guides disposed in spaced relation to and parallel to the belt stretches 1ª—1ª. In operation, cans X fed between the belt stretches 1ª and the rollers 2 are forwarded to the pockets 3 of the feed-in turret 4. The cans rest upon the table 20 and are carried thereover in a circular path by rotation of the turret 4.

It is desirable to regulate the delivery of the cans X to the turret pockets 3 so as to assure that the cans will not crowd each other as they approach the turret 4. Accordingly mechanism is provided for spacing the cans and timing their delivery so that a single can is forwarded by the belts 1 at the instant a turret pocket 3 arrives in can receiving position. In the mechanism shown an interceptor roller 36 is mounted on a vertical rod 37 attached by a nut 38 to a horizontal interceptor bar 39 mounted to slide in a bearing sleeve 40. A collar 41 secured to the rod 39 is reciprocable within the sleeve 40 and is pressed toward the right as viewed in Figure 4 by a spring 42 surrounding the rod 39 and interposed between the collar 41 and an end closure 43 screwed on the left hand end of the sleeve 40. Movement of the bar 39 under the action of the spring 42 is limited by engagement of the collar 41 with a flange 40ᵃ at the right hand end of the sleeve 40. When the rod 39 is in its extreme right hand position the roller 36 will be projected into the path of cans moving between the belt stretches 1ᵃ and the rollers 2. In this position the roller 36 holds back a can positioned in advance of the roller while the preceding can is carried forward by the belts 1 for delivery to the feed-in turret 4.

In order momentarily to withdraw the roller 36 so as to permit the next can to be carried on by the belts 1 the bar 39 is equipped with spaced collars 44 and 45 (Figure 3) which lie on opposite sides of fingers 46ᵃ formed on one arm of a lever 46 pivoted as at 47, the other arm 48 of the lever being provided with a cam follower roller 49 which engages a cam 50. The cam 50 is rotatable with the shaft 16 and is formed with a plurality of operating parts or lobes 51. In operation, when a cam lobe 51 engages the roller 49 the lever 46 is rocked clockwise as viewed in Figure 3 so as to move the bar 39 to the left and withdraw the roller 36 from in front of the can X which previously was held back by the roller 36. This permits the can to be forwarded by the belts 1 toward the point of delivery to the turret 4. The operative cam lobe 51 will move away from the roller 49 before the released can has moved completely past the roller 36. Consequently, the spring 42 will tend to return the bar 39 and roller 36 into can blocking position. However, the roller 36 will engage the side of the can so as to be held back in retracted position until the released can has moved past the roller 36. Then the spring 42 will move the bar 39 quickly so as to place the roller 36 in intercepting position in front of the next can, holding the latter stationary until the released can has been delivered to the feed-in turret 4. It will be apparent that this cycle of operation goes on continuously so as periodically to check the movement of the stream of cans, releasing one can at a time for delivery to the feed-in turret, and thereby avoiding crowding and jamming which would be apt to occur if a continuous stream of cans were fed toward the feed-in turret.

The cans being carried around by the feed-in turret 4 are held in the pockets 3 by means of an arcuate guide 52 fixed to the table 20. The guide 52 terminates in a yieldable arm 53 pivoted at 54 and being held in the normal position shown in Figure 3 by means of a spring 55. The rocking of the arm 53 under the urge of the spring 55 is limited by a nut 56 carried by a fixed stud 57. As each can is delivered to a testing unit 5 on the turret B the arm 53 yields and rocks clockwise as viewed in Figure 3 so as to permit the can to move with the testing unit and out of the pocket 3 on the feed-in turret 4.

The illustrated construction is adapted for handling cans of generally oblong or substantially rectangular shape. In order to facilitate tangential removal of the cans from the pockets 3 the latter are formed with spaced can end contacting portions 3ᵃ—3ᵃ and with projections 3ᵇ intermediate the portions 3ᵃ for contacting the radially innermost side walls of cans in the pockets. This provides for three point contact between the cans and the feed-in turret and enables the cans to be tilted relatively to the pockets 3 so that the cans can be removed tangentially from the feed-in turret after being deposited on the supports 6.

*Testing turret*

The testing turret B is mounted to rotate on a frame 58 supported on the base 15. As shown in Figure 6, bolts 59 secure a bearing post 60 to the top of the frame 58. The bearing post 60 serves to mount an antifriction hanger bearing 61 which supports and journals a turret spider 62. The spider 62 is formed with a hub 63 which receives the outer race 64 of the bearing 61. The bearing race 64 is held in place in the hub 63 by a ring 65 which is secured to the hub 63 by any suitable means (not shown). Secured to the ring 65 by means not shown is a valve disc or plate 66 formed with a plurality of ports 67 communicating respectively with radial passages 68 terminating in fittings 69. The fittings 69 are connected respectively to flexible hose 70 which lead to the testing units 5. Mounted on top of the valve plate 66 is a manifold plate 71 which is held against the valve plate 66 by a plurality of springs one of which is shown at 72. The springs 72 are interposed between the manifold plate 71 and a collar 73 held on the bearing post 60 by nuts 74 and a shim 75. The manifold plate 71 is formed with an arcuate port 76, as shown in Figures 1, 6, and 10, adapted to register with the valve plate ports 67 during rotation of the valve plate 66 while the manifold plate 71 is held stationary by a key 78 which permits the manifold plate 71 to move axially or vertically but prevents it from rotating on the post 60. Compressed air is supplied to the opposite ends of the arcuate port 76 by means of inlet pipes 77.

Formed integrally with the arms of the spider 62 is a ring 79 depending from which are circumferentially spaced vertically extending arms 80 the lower ends of which are fast with a ring 81 surrounding the frame 58. The ring 81 has a portion of its inner vertical face formed as a circular trackway engaging rollers 82 journaled on brackets 83 supported on the frame 58. The rollers 82 cooperate with the trackway for steadying the turret B as it rotates about the bearing post 60.

Another portion of the ring 81 is formed as an internal gear 84 which meshes with a gear 85 (Figure 2) secured to the top of a shaft 86 journaled in bearings 87 on the frame 58. A gear 88 secured to the lower end of the shaft 86 is adapted to be driven in a manner later to be described for rotating the shaft 86, gear 85, and the turret B.

The walls of the testing chambers 7 conform generally to the shape of the cans to be tested but the chambers are sufficiently larger than the cans to provide the air space 10 previously referred to. The chambers 7 are open at their upper ends where they are flared as at 90 (Figure 5) to facilitate introduction of the cans into the chambers. The lower ends of the chambers are mounted in pressure sealed relation on the ring 81 by packing 91 (Figure 7) held in place by retaining rings 92 in turn held down by clamping rings 93.

Operating means is provided for raising the can pads 6 for receiving the cans, for lowering them into the testing chambers, for applying the sealing heads 8 to the cans and chambers, and for then lifting the sealing heads and moving the tested cans upwardly for being removed from the testing turret B. In the form shown there is provided in connection with each testing unit a rod 94 mounted to reciprocate vertically in bearings 95—95 carried respectively by the turret rings 79 and 81. A follower roller 96 journaled on each rod 94 is operable in a cam track 97 supported on the frame 58 and extending partially around the latter. An arm 98 secured to the rod 94 is formed with an apertured boss 99 which receives for vertical adjustment a threaded stem 100, the lower end of which carries a sealing head 8. Nuts 101 and 102 screwed on the stem 100 and engaging the top and bottom faces respectively of the boss 99 secure the rod 100 in adjusted position on the arm 98. The boss 99 may be split so as to be drawn tightly into contact with the stem 100 by means of a bolt 103 for more securely locking the stem 100 in adjusted position. The head 8 may be held on the bottom of the associated rod 100 by a collar 104 welded to the rod 100 and being secured in any suitable manner to the head 8, a fiber sealing washer 105 preferably being interposed between the collar 104 and the head 8. A passage 106 in the head 8 communicates with the duct 9 in the stem 100 and provides for the introduction of air under pressure into the can X. As shown in Figure 7 a rubber sealing ring 107 carried by the head 8 is adapted to engage both the can X and the chamber 7 when the can is in readiness for testing.

At the bottom of each rod 94 is an arm 108 provided with a vertically extending bearing 109 which mounts for reciprocation a sliding rod 110 which extends through a bearing 109a in the ring 81. A pad or can support 6 is secured to the top of each rod 110 by a screw 111 and washers 112. A pin 113 fixed to the arm 108 projects through a vertically extending slot 114 formed in the rod 110. A spring 117 coiled around the rod 110 is interposed between the arm 108 and a collar 115 secured to the rod 110. The spring 117 acts as a yieldable driving connection between the rods 94 and 110 and urges the rod 110 and can support 6 to move upwardly with respect to the rod 94, the relative upward movement of the rod 110 being limited by engagement of the pin 113 with the lower end of the slot 114.

Preferably the head 6 is peripherally recessed to provide a seat 118 adapted to receive the rolled bottom seam 119 of the can to be tested and to permit the bottom of the can to rest upon the central portion of the head 6. The seat 118 and downwardly projecting seam 119 cooperate to prevent lateral movement of the can off the seat. The head is equipped with two permanent magnets 120 (Figure 9) which hold the can on the pad 6 until the can is forcibly removed from the pad by the can take-off mechanism C.

In operation, when a testing unit 5 approaches the point at which it will receive a can X to be tested the pad 6 will be in its uppermost position as shown in Figure 5. When the can is moved off the table 20 by rotation of the turret 4 it will slide onto the pad 6 to be held thereon by the magnets 120. As the turrets 4 and B continue to rotate the arm 53 will yield and rock clockwise as viewed in Figure 3 to permit the can to move on with the pad 6. As the turret B rotates the roller 96 will follow the cam track 97 so as to move the associated rod 94 downwardly, thereby lowering the sealing head 8 and the arm 108 at the bottom of the rod 94. During the first part of this downward movement of the rod 94 the spring 117 will hold the collar 115, the rod 110, and the pad 6 up in their Figure 5 positions. The can X therefore will not move downwardly during the initial downward movement of the head 8 and the head will thus be moved into engagement with the top of the can X. Thereafter continued downward movement of the rod 94 will cause the head 8, the can, the can support 6, and the rod 110 to move downwardly in unison until finally the sealing ring 107 on the head 8 engages the top of the chamber 7. At this time the parts will be in the positions shown in Figure 7 and they will be held in these positions while the turret B travels through a considerable angle of distance during which the can is tested.

The cam track 97 does not extend completely around the frame 58 and therefore it is necessary to provide means for holding the head 8 down in its Figure 7 position after the cam roller 96 moves off the cam track 97. Secured to each rod 94 is a toggle block 121 formed with a curved seat 122 extending between high points 123 and 124 as shown in Figure 15. Mounted between adjacent arms 80 on opposite sides of each rod 94 is a bracket 125 which journals a rock shaft 126 as shown in Figures 3 and 15. Fast to each rock shaft 126 are rock arms 127 and 128. Each rock arm 127 carries a roller 129 engageable with vertically spaced auxiliary cams 130 and 131. When the rod 94 has moved all the way down and the head 8 has engaged the chamber 7 the auxiliary cam follower roller 129 engages the top cam 131 so as to rock the shaft 126 clockwise as viewed in Figure 15. Upon such rocking of the shaft a roller 132 carried by the arm 128 moves to locking position in which it is received by the curved seat 122 on the block 121. In order to move onto the seat 122 the roller has to be forced slightly to override the high point 124 which thereafter prevents accidental reverse rocking of the arm 128. The arm 128 thus acts as a toggle or holding device for maintaining the rod 94 in its lowermost position after the roller 96 has moved off the portion of the cam track 97 which effected lowering of the rod 94. This insures that the head 8 will be held firmly down upon the chamber 7 so that the latter will be sealed tightly during testing.

After the testing operation has been performed the roller 132 must be moved forcibly off the seat 122 in order to permit the rod 94 to be raised so that the tested can may be lifted from the chamber 7 and delivered to the take-off turret 13. Removal of the roller 132 from the seat 122 is effected by engagement of the roller 129 with the bottom cam 130 which rocks the arms 127 and 128 counterclockwise to the dotted line position shown in Figure 15. The roller 132 will be moved from the seat 122 after the cam roller 96 has re-entered the cam track 97. Thereafter the roller 96 will be raised by another portion of the cam track 97 so as to lift the rod 94 and raise the head 8 and the can support 6. Near the end of the upward movement of the rod 94 the collar 115 will engage the bottom of the turret ring 81 which will act as a stop for arresting the rod 110 with the pad 6 in the position shown in Figure 5, which is its normal or can receiving and can discharging position.

When the container support or pad 6 is moved downwardly within the chamber 7 the air trapped under the pad 6 should be exhausted freely from the chamber 7 in order to prevent the trapping of air which would act as a cushion by producing a dashpot effect which would oppose rapid lowering of the pad 6. Inasmuch as the pad 6 is lowered rather rapidly the exhausting of air through the space between the periphery of the pad and the walls of the chamber 7 would not be rapid enough to eliminate the dashpot effect and it accordingly is desirable to provide valve controlled means for permitting the entrapped air to be exhausted freely and rapidly from the bottom end of the chamber 7. As shown in Figure 9 the ring 81 is formed with an exhaust passage 133 leading from the bottom of the chamber 7 to a valve seat 134 controlled by an exhaust valve element 135 yieldably urged to closed position by a spring 136. The valve element 135 is carried by a stem 137 mounted to slide in a guide sleeve 138 fitted in the ring 81. The lower end of the rod 137 is provided with a collar 139 which has a pin 140 extending with clearance into an opening in the end of a lever 141 pivoted as at 142 (Figure 16) on a web 143 extending down from the ring 81. The other end of the lever 141 is equipped with a roller 144 arranged to cooperate with a cam 145 on the frame 58.

In operation, when one of the rods 94 starts moving downwardly the associated roller 144 engages the cam 145 so as to rock the lever 141 and move the valve 135 downwardly away from the seat 134, thereby opening the exhaust passage 133 and venting the chamber 7, thus permitting the pad 6 to be lowered without having to work against air entrapped in the chamber 7. The contour of the cam 145 is such that when the pad 6 has been moved to its lowermost position and while it is being held there during the testing operation, the valve 135 will be closed. After the testing has been completed and in order to permit air to enter the bottom of the chamber 7 freely when the pad 6 is being raised the cam 145 operates the roller 144 to open the valve 135. Thus the cam 145 is so shaped as to cause the valve 135 to be held open during both lowering and raising of the pad 6 but to be held closed during the testing operation when the pad is in its lower position.

Each hose 70 previously referred to is fitted over a tubular end 146 at the top of the stem 100 of one of the testing units 5. Thus when the associated port 67 registers with the arcuate manifold 76 air under pressure will be supplied through the duct 9 of that unit 5. At this time the can X being tested will be in the position shown in Figure 7. The sealing ring 107 will be in engagement with the flared end 90 of the chamber 7 and with the outwardly turned top end 147 of the can being tested. If the can is not leaky the compressed air will be confined to the can itself. If, however, the can is leaky compressed air will flow into the space 10 between the can and the chamber 7 and thence down under the head 6 and into the passage 11 to the pressure responsive detector 12.

Each detector unit 12 is carried by a bracket 148 secured to the ring 81 by bolts 149 as shown in Figure 10. Formed integrally with each bracket 148 is a pad 150 which mounts a liquid switch casing 151. Each pad 150 is formed with a pressure chamber recess 152 surrounded by a seat 153. The associated casing 151 is formed with a boss 154 which fits into a recessed pad to mount a pressure responsive mechanical member comprising a diaphragm 155 on the seat 153, a spacing washer 156 being interposed between the diaphragm 155 and the boss 154. The air passage 11 communicates with a cross passage 157 which terminates in a fitting 158 connected to one leg of a U-shaped tube 159, the other leg of which is connected to a fitting 160 at the end of a passage 161 in the pad 150. Air under pressure which leaks through a can being tested and enters the passage 11 will pass through the cross passage 157, the tube 159, and the passage 161 into the recess 152 so as to deflect the diaphragm 155, which forms one wall of the pressure chamber 152.

Deflecting movement of the diaphragm is utilized to close an electric circuit for operating mechanism in the control housing E which in turn causes operation of the deflector gate D. A tube 162 formed of insulating material is mounted in the switch casing 151 and is held in place by an insulating screw sleeve 163. The upper end of the tube 162 is formed with a chamber 162ª which receives a finger member or contact part 164 carried by and extending downwardly from a conducting plug 165 inserted in the insulating sleeve 163. The lower end of the tube 162 is formed with a passage 166 which extends from the chamber 162ª to a vertical passage 167 formed in the switch casing 151. A lateral passage 168 provides communication between the vertical passage 167 and the space between the diaphragm 155 and the boss 154. The vertical passage 167 extends downwardly past the lateral passage 168 to communicate with a chamber 169 closed at its lower end by a threaded adjusting plug 170 the bottom portion of which is formed as a smooth rod 171 extending through packing 172 held in place by a gland nut 173. A knurled head 174 on the bottom of the rod portion 171 provides for turning of the screw plug 170 to vary the volume or capacity of the chamber 169.

The space between the diaphragm 155 and the boss 154, the passages 168, 167, and 166, and the chamber 169 are filled with a conducting liquid 175 which extends up into the chamber 162ª normally to a level just below the bottom of the contact finger 164.

In operation, if a can leaks air under pressure will deflect the diaphragm 155 in the manner previously described so as to raise the fluid column in the chamber 162ª whereupon the fluid will make contact with the finger 164. This closes an electrical circuit which operates the mechanism in the housing E for bringing about operation of the rejecter gate D.

The control housing E encloses conventional relays or other suitable electrical control equipment which when energized acts to close a circuit through conductors 176 leading to the solenoid F. The relay or other electrical equipment within the housing E is actuated in response to arrival at the housing E of a testing unit 5 carrying a leaky can. As shown in Figures 10 and 16 the housing E supports a bracket 177 on which are mounted two contact bars 178 and 179 both of which are insulated from the bracket 177. The contact bars 178 and 179 are disposed respectively in the paths of brushes 180 and 181 carried by the switch casing 151. The brushes are resiliently urged outwardly to have wiping engagement with the contact bars. The brush 181 is grounded through the metallic switch casing 151 and the brush 180 is connected by a conductor 182 to the plug 165 which, as previously stated, mounts the contact member 164. The conducting liquid 175, of course, is grounded by its contact with the switch casing 151 and diaphragm 155. Conductors 183 and 184 lead respectively from the bars 178 and 179 into the control housing E. Conductors 185 lead from opposite sides of a power supply line 186 into the housing E. As previously stated the electrical equipment mounted in the housing E is of a conventional nature and therefore it is not illustrated specifically. However, Figure 17 does show diagrammatically the ultimate connections made effective by operation of the equipment in the housing E. Connections within the housing and which are of a permanent nature, that is, are in effect at all times, are shown in full lines in Figure 17, it being understood that suitable relays, contactors, or the like, are appropriately inserted in the connections 183ª and 184ª shown in full lines. The connection 176ª indicated by the dotted line is made effective when the testing unit carrying a leaky can moves up adjacent the housing E.

In operation, when a testing unit 5 moves alongside the housing E the brushes 180 and 181 will make contact with the bars 178 and 179. If the can carried by that particular testing unit 5 is not leaky the fluid 175 will be down and not in contact with the contact part 164 so that no circuit will be completed through the conductors 183ª and 184ª. Consequently, the connection 176ª indicated by the dotted line in Figure 17 will not be made effective and the solenoid F will not be energized. If, however, the can carried by a testing unit 5 has a leak the conducting fluid 175 will be displaced by deflection of the diaphragm 155 so as to make contact with the member 164 when the brushes 180 and 181 are in engagement with the bars 178 and 179. Consequently, a circuit will be completed through the conductors 183ª and 184ª shown in full lines within the housing E causing the dotted line connection 176ª to be made effective so that the solenoid F will be energized. Energizing of the solenoid F conditions mechanism carried by the turret 13 to actuate the gate D for rejecting the leaky can when it arrives at the gate as will be described in more detail hereinafter.

*Can take-off and leaky can rejecter mechanism*

The can take-off mechanism which comprises broadly the turret 13 and the discharge conveyor chain 14 is mounted on a frame 187. A vertical shaft 188 is journaled on the frame 187 by a bearing 189 near the top end of the shaft 188 and by any suitable bearing (not shown) at the lower end of the shaft. The shaft 188 is equipped with a gear 200, shown in Figure 18, adapted to be driven in a manner to be described later so as to rotate the turret 13 in the direction of the arrow c (Figures 1 and 11).

The turret 13 comprises a lower section 201 keyed to the shaft 188 as at 202. Pocket members 203 secured to the lower turret section 201 are spaced circumferentially about the shaft 188 so as to receive tested cans from the testing turret B. The turret lower section 201 is formed with a plurality of vertically bored bosses 204 which mount rods 205 respectively for vertical sliding movement normal to the plane of rotation of the turrets. The rods 205 are held against rotation in the bosses 204 by splines 206. The lower end of each rod is equipped with a horizontal pin 207 which mounts a cam follower roller 208 adapted to run on a cam track 209 fixed to the frame 187. Adjustably secured on each rod 205 above the associated boss 204 is a vertically movable turret top section 210 which is keyed to the associated rod 205 as at 211 and is held in vertically adjusted position by a set screw 212. The top turret sections 210 are formed with pockets 213 aligned respectively with the pockets in the lower turret pocket members 203. The pockets 213 in the top turret sections 210 are so shaped as to partially embrace a can X and to extend under the upper laterally projecting end portion 147 of the can. Thus, when a pair of pockets 213—203 moves into position to receive a can from the testing turret B the top section 210 will embrace the side walls of the can adjacent its upper end but will lie under the can flared end 147 so that when the associated rod 205 is lifted by the action of the cam 209 on the roller 208 the top turret section 210 will connect with the can flared end 147 and will lift the can directly away from the pad or support 6 until the double rolled seam 119 at the bottom of the can is moved out of the pad recess 118. This permits the can subsequently to be moved horizontally away from the pad or support 6. As the turret 13 rotates, the can just removed from the turret B will be suspended by engagement of the can flared end 147 with the top turret section 210. The lower turret pocket section 203 will embrace the can so as to hold it steady. The can will be held against movement out of the pocket members 203 and 210 by means of a fixed guide 214, the gate D, and a fixed guide 215. When the can has been moved over the discharge chain 14 the cam track 209 will move the roller 208 downwardly to lower the rod 205 and top cam section 210 so as to deposit the can on the chain 14.

The discharge conveyor chain 14 is passed around and driven by a sprocket 216 mounted on a shaft 217. The chain also passes around a front idler sprocket 218 rotatable on a stub shaft 219 and a rear idler sprocket 220 rotatable on a stub shaft 221. For driving the sprocket 216 a bevel gear 222 secured to the shaft 217 meshes with a bevel gear 223 secured to the shaft 188 which drives the turret 13. Thus the chain 14 is driven in time with the turret 13 so as to discharge cans at a rate corresponding to the rate of delivery by the turret 13. Cans being carried by the chain 14 move between the guide 215 previously referred to and a parallel guide 224 on the opposite side of the chain.

It will be understood that normally, i. e., in the forwarding of good or non-leaky cans, the gate D will be in the position shown in Figures 1 and 11 wherein it serves merely as a guide interposed between the fixed guides 214 and 215. The turret 13 carries actuating mechanism responsive to movement of the diaphragm 155 and adapted to be conditioned by operation of the solenoid F for moving the gate in a manner to cause it to divert a leaky can before the can is carried as far as the guide 215. In the form shown the gate operating mechanism includes a rotor 225 secured to the shaft 188 below the bearing 189. Associated with each pair of take-off turret sections 203—210 are actuators comprising two vertical pins 226 and 227 mounted to reciprocate in bearings 228 and 229 respectively. The axes of both pins 226 and 227 are normal to a radius of the turret 13 bisecting the associated turret sections 203—210.

The pins 226 and 227 are formed respectively at their upper ends with heads 230 and 231 and at their lower ends are provided with racks 232 and 233. A pinion 234 interposed between and meshing with both racks of each pair of pins 226—227 is journaled on a web 235 depending from the rotor 225. Each outer pin 226 carries a block 236 which mounts a cam follower roller 237 adapted to move over and engage a setting cam 238 for raising the outer pin 226 and to move under and engage a re-setting cam 239 for lowering the outer pins. It will be apparent that the double rack and pinion connection between the pairs of pins 226—227 will cause the inner pins 227 to be raised when the outer pins 226 are lowered and will cause the pins 227 to be lowered when the pins 226 are raised. The positioning of the pins 226—227 determines whether or not the gate D is operated to reject a can so as to prevent its being forwarded to the guide 215.

The cam 238 acts under control of the testing units 5 for conditioning the respective actuator pins 226 to effect movement of the gate D from normal position to can-diverting position when a leaky can arrives at the gate. Referring more in detail to the mechanism for operating the pins 226—227, the setting cam 238 (Figure 11) is mounted on a horizontal rod 240 reciprocable in a fixed bearing 241. The end of the rod 240 opposite the cam 238 is pivoted to one end of a lever 242 mounted at 243 to rock on a fixed bracket 244. The other end of the lever 242 is pivoted to a link 245 which in turn is pivoted to the plunger 246 of the solenoid F.

In operation, the solenoid F is normally de-energized and the setting cam 238 is positioned out of the path of the cam follower rollers 237. The outer pins 226 normally are down or in their lowered positions and the associated rollers will move past the cam 238 without engaging the cam so that the pins 226 will remain down. However, if a can being tested on the turret B leaks the solenoid F will be energized in the manner previously described just before the can pocket on the turret 13 which is timed to receive the leaky can from the turret B moves up to the pin-conditioning cam 238. Energizing of the solenoid will cause the cam 238 to be moved into the path of the roller 237 associated with the approaching can pocket 213. Then the cam 238 will move the roller 237 upwardly so as to lift the associated outer pin 226.

The gate D is secured to a vertical shaft 247 fast with which is a rock arm 248 pivoted as at 249 to one end of a link 250. The other end of the link 250 is pivoted as at 251 to a gate operating cam lever device 252 mounted to rock about a fixed pivot 253. The cam lever 252 is rockable in a horizontal plane above the path of the pins 226—227 and on its bottom surface is formed with pads 254 and 255 respectively providing a gate operating cam surface 256 and a gate resetting cam surface 257.

In operation, the cam lever 252 normally is positioned as shown in Figure 11 so that the gate D is held in its normal position permitting cans to be carried around by the turret 13 past the gate D to the guide 215 and to the discharge chain 14. When cans delivered to the turret 13 have withstood the test on the turret B without leaking all of the outer pins 226 will be down and the inner pins 227 will be up. The heads 231 on the inner pins will pass between the pads 254 and 255 on the cam lever 252 without operatively engaging the cam surfaces so that the cam lever 252 and the gate D will remain in their normal positions.

When, however, a leaky can is detected by the detector unit 12 the solenoid F will be energized so as to move the pin-conditioning cam 238 into operative position. The roller 237 associated with the can pocket 213 which is timed to receive the leaky can will engage the cam 238 and will be moved upwardly to the position shown at the left in Figure 14. The can receiving pocket 213 associated with the lifted pin 226 will then move on around, pick up the leaky can and move it to the gate D. The head 230 on the lifted pin 226 will engage the operating cam surface 256 so as to rock the cam lever 252 clockwise as viewed in Figure 11 to thereby swing the gate D outwardly and cause the leaky can to be rejected.

If the next following pocket 213 also is forwarding a leaky can, the associated outer pin 226 will be in raised position so that the cam lever 252 will not be moved, the gate D will remain open, and the can last referred to also will be rejected. If, however, the next following can is a good or non-leaky can the associated outer pin 226 will be down and the inner pin 227 will be up. The head 231 on the inner pin 227 will engage the gate resetting cam surface 257 so as to rock the cam lever 252 counterclockwise as viewed in Figure 11, thereby moving the gate D back to its normal position to cause the non-leaky can to be carried on around to the discharge chain 14.

After each pair of pins passes the cam lever 252 they move past the resetting cam 239. If an outer pin 226 is in raised position when it leaves the gate D the associated roller 237 will engage the resetting cam 239 which will cause the pin 226 to be moved downwardly to the normal position shown at the right in Figure 12. Consequently, each of the outer pins 226 will be in its lower position when it moves up to the setting cam 238. Unless the setting cam 238 has been moved to its operative position by detection of a leaky can the outer pins 226 will remain down.

*Driving mechanism*

The belts 1, the feed-in turret 4, the testing turret B, the take-off turret 13, and the discharge conveyor chain 14 may all be driven by an electric motor 258. A motor pulley 259 is connected by a belt 260 to a pulley 261 which drives a worm and gear speed reduction unit generally designated 262. The output gear 263 of the unit 262 meshes with the gear 88 on the shaft 86 and thus drives the gear 85 to rotate the testing turret ring gear 84. An idler gear 264 journaled on a shaft 265 meshes with the gear 88 and with another idler gear 266 journaled at 267. The idler gear 266 meshes with the gear 19 to drive the feed-in turret 4 and the belts 1, and also meshes with the gear 200 on the shaft 188 for driving the take-off turret 13 and the conveyor chain 14. The gears referred to all rotate in the directions indicated by the arrows in Figure 18.

The apparatus disclosed embodies the invention in a preferred form but it will be understood that changes in the construction and arrangement of the parts may be made without departing from the invention as defined in the claims.

I claim:

1. In apparatus for testing cans for leaks, means providing a testing chamber for receiving a can to be tested with a space between the can and the testing chamber walls; means for sealing said space against communication with the interior of said can; a fluid containing pressure chamber communicating with said space; a diaphragm forming one wall of said pressure chamber and being deflectable in response to change in pressure in said chamber; means supporting a column of electrically conducting fluid in contact with said diaphragm and out of contact with fluid in said pressure chamber, the diaphragm separating the fluid in the pressure chamber from the conducting fluid; an electrical contact part positioned adjacent the top of said column of conducting fluid so as to be engaged by or not to be engaged by said conducting fluid depending upon the height of the fluid column; a threaded device contacting said conducting fluid and being adjustable by rotation for displacing said conducting fluid to vary the height of said column independently of deflecting of said diaphragm; means for separating leaky cans from non-leaky cans; electrically actuated means controlled by engagement of said conducting fluid with said contact part for operating said separating means; and means for subjecting the interior of said can to fluid pressure.

2. In apparatus for testing cans for leaks, a testing chamber open at one end to receive a can to be tested; a can support; means mounting said support to reciprocate in said chamber; operating means for moving said can support inwardly to position a can within said chamber for testing, for holding said support in its inner position during testing of the can, and for moving said support outwardly to eject the can from the chamber; means for testing the can when said support is in its inner position; an exhaust passage adapted to provide pressure relief for the space in said chamber between said can support and the opposite end of said chamber; an exhaust valve movable for closing and opening said passage; and means for working in timed relation to said operating means for opening said valve during the inward movement of said support, for closing said valve and maintaining it closed while the support is held in its inner position and the can is being tested, and for opening said valve after testing and holding it open during outward movement of said support.

3. In apparatus for testing cans for leaks, a testing chamber open at one end for receiving a can to be tested with a space between the can and the testing chamber walls; means for moving a can into and for ejecting it from said testing chamber; means for sealing said space against communication with the interior of a can in testing position within the testing chamber; a fluid containing pressure chamber communicating with said space; displaceable means associated with said pressure chamber and being movable in response to change in fluid pressure therein; means for separating leaky cans from non-leaky cans; actuating means operable in response to movement of said displaceable means for operating said separating means; means for applying fluid pressure to the interior of a can in testing position within said testing chamber; an exhaust passage for venting said testing chamber, said space, and said pressure chamber while the can is being moved into and out of said testing chamber; a valve for controlling flow through said passage; and means operable in timed relation to operation of said can moving means for opening said valve while the can is being moved into said testing chamber, for closing said valve and maintaining it closed during can testing, and for opening said valve when the can is being moved out of said testing chamber.

4. In apparatus of the character described, a testing chamber open at one end; a can support reciprocable in said chamber; a first reciprocable member connected to said can support; a second reciprocable member; a yieldable driving connection between said reciprocable members operative when said second reciprocable member is moved in one direction for driving said first reciprocable member to move said support toward the open end of the chamber; a stop for arresting said first reciprocable member when said support is in can-receiving position adjacent said chamber open end and for holding said support stationary during continued movement of said second reciprocable member; a sealing head connected to said second reciprocable member in alignment with said chamber; and means for reciprocating said second reciprocable member, the construction and arrangement being such that during the first part of the movement of said second reciprocable member in the opposite direction said yieldable connection and said stop cooperate to hold said support stationary adjacent the chamber open end with a can on said support until said sealing head engages the can after which said sealing head, the can, said support and said reciprocable members move together to position the can within said chamber and to bring said sealing head into engagement with said chamber open end.

5. In apparatus of the character described, a testing chamber open at one end; a can support reciprocable in said chamber; a first reciprocable rod connected to said support and projecting through the opposite end of said chamber; a second reciprocable rod mounted to move parallel to the line of movement of said first rod and extending longitudinally beyond both ends of said chamber; an arm connected to said second rod and having a bearing through which said projecting portion of said first rod extends for sliding movement; a collar on said first rod between said arm and said chamber; a spring interposed between said arm and said collar for urging said support to move towards the container open end; a stop engageable by said collar for opposing spring urged movement of said support to arrest the support in can receiving position adjacent the chamber open end; a sealing head mounted on said second reciprocable member beyond and in alignment with said chamber open end; and means for first moving said second reciprocable member in one direction to move said head into engagement with a can on said support when the latter is in said can-receiving position, to continue to move in said direction for causing said head, said can, and said support to move together until said head engages said chamber open end, and for then moving said second reciprocable member in the opposite direction for separating said head from said chamber open end and said can end and for effecting movement of said support back to can-receiving position.

6. In apparatus of the character described, a testing chamber open at one end for receiving a can to be tested; a sealing head; a reciprocable member connected to said head for moving it into and out of engagement with said chamber open end; means for driving said reciprocable member; and means for locking said reciprocable member in the position in which it holds said sealing head in engagement with said chamber open end, said means comprising a seat on said reciprocable member; a holding device mounted to move into and out of engagement with said seat; and means operated in time with said driving means for moving said holding device into engagement with said seat when said head has been moved into engagement with said chamber open end and for moving said holding device out of engagement with said seat after testing and prior to the operation of said driving means which moves said head out of engagement with said chamber open end.

7. In apparatus of the character described, a testing chamber open at one end for receiving a can to be tested; a sealing head; a reciprocable member connected to said head for moving it into and out of engagement with said chamber open end; means for driving said reciprocable member; and means for locking said reciprocable member in the position in which it holds said sealing head in engagement with said chamber open end, said means comprising a seat on said reciprocable member; a toggle lever equipped with a roller mounted to move into and out of engagement with said seat; and means operated in time with said driving means for moving said toggle lever to place said roller in engagement with said seat when said head has been moved into engagement with said chamber open end and for moving said toggle lever to remove said roller from engagement with said seat after testing and prior to the operation of said driving means which moves said head out of engagement with said chamber open end.

8. In apparatus of the character described, a turret; a testing chamber mounted on said turret and being open at one end; a sealing head; a reciprocable member mounted on said turret and being connected to said sealing head for moving it into and out of engagement with the open end of said sealing chamber; a cam follower connected to said reciprocable member; a cam extending throughout a portion only of the path of said follower as it travels around with said reciprocable member on said turret, said cam having a first portion which acts on said follower to drive said head into engagement with said chamber open end and a second portion which thereafter acts on said follower to move said head away from said sealing chamber open end; and means independent of said cam and follower for holding said sealing head in engagement with the open end of said chamber while said follower is moving from said first cam portion to said second cam portion.

9. In apparatus of the character described, a turret; a testing chamber mounted on said turret and being open at one end; a sealing head; a reciprocable member mounted on said turret and being connected to said sealing head for moving it into and out of engagement with the open end of said sealing chamber; a head operating cam follower connected to said reciprocable member; a cam extending throughout a portion only of the path of said follower as it travels around with said reciprocable member on said turret, said cam having a first portion which acts on said follower to drive said head into engagement with said chamber open end and a second portion which thereafter acts on said follower to move said head away from said sealing chamber open end; a toggle device including a part mounted on said turret and a part connected to said reciprocable member; an auxiliary cam follower connected to said turret-mounted toggle device part; and auxiliary cam means cooperable with said auxiliary cam follower for actuating said toggle device to hold said sealing head in engagement with the open end of said testing chamber while said head operating cam follower is moving from said first cam portion to said second cam portion.

10. In apparatus of the character described, a turret; a testing chamber mounted on said turret and being open at one end; a sealing head; a reciprocable member mounted on said turret and being connected to said sealing head for moving it into and out of engagement with the open end of said sealing chamber; a head operating cam follower connected to said reciprocable member; a cam extending throughout a portion only of the path of said follower as it travels around with said reciprocable member on said turret, said cam having a first portion which acts on said follower to drive said head into engagement with said chamber open end and a second portion which thereafter acts on said follower to move said head away from said sealing chamber open end; a toggle block mounted on said reciprocable member and being formed with a seat; a rockable toggle lever mounted on said turret and being equipped with a roller adapted to engage said seat; an auxiliary cam follower connected to said toggle lever; and auxiliary cam means cooperable with said auxiliary cam follower means for rocking said toggle lever to position said roller on said seat to hold said sealing head on said chamber open end while said head operating cam follower is moving from said first cam portion to said second cam portion, and for then moving said lever to remove said roller from said seat to enable said second cam portion to act on said head operating cam follower for moving said head away from said testing chamber open end.

11. In apparatus of the character described, a turret having circumferentially spaced can-receiving pockets; and means for delivering cans to said turret pockets comprising a plurality of rollers together constituting a can guide, a belt having a stretch extending in spaced parallel relation to said guide for frictionally engaging cans located between the guide rollers and said belt stretch, means for driving said belt to forward cans to said turret pockets, a can interceptor bar, an interceptor roller journalled on said bar between rollers comprising said guide and with its periphery aligned with the guide forming peripheral portions of the guide rollers when said bar is retracted, means mounting said bar to reciprocate substantially normal to the path of cans moved by said belt, a spring for yieldably urging said bar to move into said path, a cam rotatable in unison with said turret, and a cam follower connected to said bar and being operable by said cam for periodically retracting said bar and interceptor roller to release cans one at a time for delivery by said belt to the turret pockets.

12. In apparatus of the character described, a first turret; a plurality of units circumferentially spaced on said turret and each including a support for receiving and holding a can; a feed-in turret provided with a plurality of circumferentially spaced pockets open at the periphery of said feed-in turret for receiving individual cans and delivering them to said supports, each of said pockets having spaced can end contacting portions and a projection intermediate said can end contacting portions for contacting the radially innermost side wall of a can in the pocket to thus provide three point contact between the can and feed-in turret thereby enabling the can to be tilted relatively to said pocket to enable tangential removal of the can from the pocket; a fixed guide extending partially around said feed-in turret for confining cans to said pockets; means on said first turret for retaining cans on said supports after delivery thereupon by said feed-in turret; a movable guide portion normally forming a continuation of said fixed guide at the point of transfer of cans from said feed-in turret to said first turret; and means normally holding said movable guide portion in its normal position but being yieldable to enable said movable guide portion to move out of the way to permit a can once positioned on one of said supports to move out of the feed-in turret pocket which forwarded it to said support.

13. In apparatus of the character described, a first turret; a support on said turret for carrying a can; means for normally preventing lateral movement of the can off the support; a take-off turret for receiving cans from said first turret; a pocket member adapted to partially embrace a can on said support and to connect with said can; means mounting said pocket member on said take-off turret to move substantially normal to the plane of rotation of said first turret; and means operated in time with said turrets for moving said pocket member to move said can directly away from and in line with said support to thus render ineffective the lateral-movement-preventing means and to enable said can to be carried off by said take-off turret.

14. In apparatus of the character described, a first turret rotatable in a horizontal plane; a support on said turret facing upwardly and being formed with a peripherally recessed seat adapted to receive the peripheral downwardly projecting portion of a can positioned on said support from above; a take-off turret rotatable in a horizontal plane for transporting cans from said first turret; a pocket member on said take-off turret adapted to partially embrace a can on said support and to extend under a laterally projecting portion of the top end of the can; means mounting said pocket member to move vertically on said take-off turret; and means operated in time with said turrets for moving said pocket member up into engagement with said laterally projecting can portion and for then lifting the can off said seat whereby the can may then be moved laterally away from said support and carried by said take-off turret away from said first turret.

15. In apparatus of the character described, a first turret rotatable in a horizontal plane; a support on said turret facing upwardly and being formed with a peripherally recessed seat adapted to receive the peripheral downwardly projecting portion of a can positioned on said support from above; a take-off turret rotatable in a horizontal plane for transporting cans from said first turret; a pocket member on said take-off turret adapted to partially embrace a can on said support and to extend under a laterally projecting portion of the top end of the can; means mounting said pocket member to move vertically on said take-off turret; a cam follower connected to said pocket member; and a cam engaged by and being operable upon said follower during rotation of said take-off turret for moving said pocket member up into engagement with said laterally projecting can portion and for then lifting the can off said seat whereby the can may then be moved laterally away from said support and carried by said take-off turret away from said first turret.

16. In apparatus of the character described, means for testing cans for leaks; a turret for transporting tested cans to a discharge point; means adapted to divert cans from said turret to prevent their being carried to said discharge point; a cam device operatively connected to said can diverting means for moving the latter from normal position to can-diverting position; an operating cam surface on said cam device; a resetting cam surface on said cam device; actuator means carried by said turret and being engageable selectively with said operating cam surface for moving said cam device to move said diverting means to can-diverting position or with said resetting cam surface for moving said cam device to return said diverting means to normal position; and means operated under control of said testing means for conditioning said actuator means to engage said operating cam surface to effect diverting of a leaky can.

17. In apparatus of the character described, means for testing cans for leaks; a turret for transporting tested cans to a discharge point and having a plurality of can receiving parts; a gate adapted to divert leaky cans from said turret prior to arrival at said discharge point; a cam lever operatively connected to said gate for moving the gate from normal position to can-diverting position and vice versa; an operating cam surface on said cam lever; a resetting cam surface on said cam lever; a plurality of pairs of cam operating pins on said turret, there being one pair associated with each can-receiving part; means mounting said pins to shift on said turret, one pin of each pair to shift into and out of position to be engageable with said operating cam surface and the other pin of each pair to shift into and out of position to be engageable with said resetting cam surface; and means operable under control of said testing means for so shifting said pins that said gate will be positioned in can-diverting position when a leaky can arrives at the gate and will be positioned in normal position when a non-leaky can arrives at said gate.

18. In apparatus of the character described, means for testing cans for leaks; a turret for transporting tested cans to a discharge point and having a plurality of can receiving parts; a gate adapted to divert leaky cans from said turret prior to arrival at said discharge point; a cam lever operatively connected to said gate for moving the gate from normal position to can-diverting position and vice versa; an operating cam surface on said cam lever; a resetting cam surface on said cam lever; a plurality of pairs of cam operating pins on said turret, there being one pair associated with each can-receiving part; means mounting said pins to shift on said turret, one pin of each pair to shift into and out of position to be engageable with said operating cam surface and the other pin of each pair to shift into and out of position to be engageable with said resetting cam surface; a double rack and gear connection between the pins of each pair whereby when one of said pins is shifted into position for engaging said operating cam surface the other pin of the pair will be shifted into inactive position and when said one of said pins is shifted to inactive position said other of said pins will be shifted into position for engaging said resetting cam surface; a pin conditioning cam mounted to move from an inactive position to an active position in which it shifts one of said pins into position to be engageable with said operating cam surface for effecting movement of said gate to diverting position when the can receiving turret part associated with said shifted pin arrives at said gate; means operated under control of said testing means for moving said pin-conditioning cam to active position; and means operable upon said pins after they pass said cam lever and before they again reach said pin-conditioning cam for shifting said pins back to the positions they occupied before being shifted by said pin-conditioning cam.

19. In apparatus of the character described, a testing turret; a plurality of testing units on said turret including a plurality of can supports; a take-off turret positioned to receive tested cans from said testing turret and having a plurality of can receiving parts adapted to receive individual tested cans and to forward them to a delivery point; means for driving said turrets in timed relation; means associated with said take-off turret and being normally set to enable cans to be forwarded to said delivery point but being settable to operative position to divert cans from said take-off turret prior to arrival at said discharge point; means for setting said diverting means in operative position including a plurality of actuators mounted on said take-off turret for movement to active or inactive positions, there being one actuator associated with each can receiving part; and means operable under control of the testing means which tests a leaky can on said testing turret for moving to active position the actuator associated with the take-off turret can-receiving part which is timed to receive that can so as to condition said actuator to set said diverting means in can diverting position when said can is positioned at said diverting means.

20. In apparatus for testing cans for leakage, a rotary turret structure, means on said structure providing a plurality of equidistantly spaced testing chambers each adapted to receive a can to be tested with a space between the can and the testing chamber walls; means for sealing each said space against communication with the interior of a can in the respective chamber; means on the turret structure providing a multiple of fluid containing pressure chambers one disposed to communicate with each said space; a diaphragm associated with each said pressure chamber and having a face subjected to fluid under pressure in the associated space and being deflectable in response to change in fluid pressure in said space; means permanently trapping a column of liquid in contact with the respective diaghram at the side thereof away from the associated space and in position for being lifted and lowered by movement of said diaphragm in response to fluid pressure in the respective pressure chamber; electrically actuated means for separating leaky cans from non-leaky cans; means for controlling operation of said separating means in timed relation to the turret movement and responsive to lifting of the liquid columns by said diaphragm and including circuit making and breaking elements movable with each pressure chamber and a contact in each said pressure chamber engaged by the lifted liquid column therein; and means for subjecting the interior of said can to fluid pressure.

21. In apparatus for testing cans for leakage, means providing a movable testing chamber for receiving a can to be tested with a space between the can and the testing chamber walls; means for sealing said space against communication with the interior of said can; means providing a fluid containing pressure chamber communicating with said space and movable with said testing chamber; a diaphragm associated with the pressure chamber and having a face subjected to fluid under pressure in said space and being deflectable in response to change in fluid pressure in said space; means permanently trapping a column of liquid in contact with the diaphragm at the side thereof away from said space and in position for being lifted and lowered by movement of said diaphragm in response to fluid pressure in the respective pressure chamber; electrically actuated means for separating leaky cans from non-leaky cans; means for controlling operation of said separating means responsive to lifting of the liquid column and including circuit making and breaking elements movable with the pressure chamber and a contact engaged by the lifted column therein; and means for subjecting the interior of said can to fluid pressure.

22. Apparatus as defined in claim 21 in which there is included in the liquid column trapping means a threadably mounted column displacer plug adjustable to displace a greater or lesser amount of the column liquid to vary the spacing between the top of said liquid and the contact thereabove.

HARRY C. GRAY.

REFERENCES CITED

The following references are of record in the file of this patent:

UNITED STATES PATENTS

| Number | Name | Date |
| --- | --- | --- |
| 1,023,074 | Gaynor | Apr. 9, 1912 |
| 1,053,209 | Neumann | Feb. 18, 1913 |
| 1,343,417 | Steere | June 15, 1920 |
| 1,422,229 | Sharp | July 11, 1922 |
| 1,645,018 | O'Neil | Oct. 11, 1927 |
| 1,815,522 | O'Neil et al. | July 21, 1931 |
| 1,815,523 | O'Neil et al. | July 21, 1931 |
| 1,815,837 | Deisch | July 21, 1931 |
| 1,873,602 | Kruse | Aug. 23, 1932 |
| 1,900,918 | Dieter | Mar. 14, 1933 |
| 1,914,806 | Hormel | June 20, 1933 |
| 2,013,144 | Gladfelter | Sept. 3, 1935 |
| 2,019,517 | Widell | Nov. 5, 1935 |
| 2,112,536 | Krueger | Mar. 29, 1938 |
| 2,232,711 | Maher | Feb. 25, 1941 |
| 2,330,229 | Maher | Sept. 28, 1943 |
| 2,332,525 | Peck | Oct. 26, 1943 |
| 2,371,926 | Schmitt | Mar. 20, 1945 |